(12) United States Patent
Kobori

(10) Patent No.: US 10,434,701 B2
(45) Date of Patent: Oct. 8, 2019

(54) WELDING METHOD AND WELDING STRUCTURE

(71) Applicant: YACHIYO INDUSTRY CO., LTD., Saitama (JP)

(72) Inventor: Hiroyasu Kobori, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/770,383

(22) PCT Filed: Oct. 13, 2016

(86) PCT No.: PCT/JP2016/080313
§ 371 (c)(1),
(2) Date: Apr. 23, 2018

(87) PCT Pub. No.: WO2017/069029
PCT Pub. Date: Apr. 27, 2017

(65) Prior Publication Data
US 2018/0311885 A1 Nov. 1, 2018

(30) Foreign Application Priority Data

Oct. 23, 2015 (JP) ................................ 2015-209092

(51) Int. Cl.
*B29C 51/00* (2006.01)
*B29C 51/12* (2006.01)
(Continued)

(52) U.S. Cl.
CPC .............. *B29C 51/12* (2013.01); *B29C 49/20* (2013.01); *B29C 51/10* (2013.01); *B29C 51/36* (2013.01);
(Continued)

(58) Field of Classification Search
CPC .. B60K 15/03; B60K 15/07; B60K 15/03177; B60K 2015/03493
(Continued)

(56) References Cited

U.S. PATENT DOCUMENTS 5,103,865 A 4/1992 Hyde
6,737,132 B1 * 5/2004 Michihata ................. B32B 1/02
428/35.7
(Continued)

FOREIGN PATENT DOCUMENTS

EP 1 099 529 A1 5/2001
EP 2 353 914 A1 8/2011
(Continued)

OTHER PUBLICATIONS

Extended European Search Report from EP 16 85 7344 dated Aug. 22, 2018, by European Patent Office—(8 pages).
(Continued)

*Primary Examiner* — Ernesto A Grano
(74) *Attorney, Agent, or Firm* — Captiol City TechLaw, PLLC; Samuel P. Burkholder

(57) ABSTRACT

Provided is a method for welding an accessory part made of a thermoplastic resin to a parison which is being molded into a tank body. The method includes steps of: forming the accessory part to include an annular portion having an annular shape and a plurality of projections each projecting from the annual portion in a radially inward direction; and pressing the annular portion and the projections into the parison to be welded to the parison. Also provided is a welding structure of a tank body made of a resin and an accessory part made of a thermoplastic resin and welded to a wall surface of the tank body. The accessory part includes: an annular portion having an annular shape; and a plurality of projections each projecting from the annular portion in a (Continued)

radially inward direction. The annular portion and the plurality of projections are welded to the wall surface.

3 Claims, 7 Drawing Sheets

(51) Int. Cl.
| | |
|---|---|
| B29C 65/70 | (2006.01) |
| B29C 49/20 | (2006.01) |
| B29C 51/10 | (2006.01) |
| B29C 51/36 | (2006.01) |
| B29L 31/00 | (2006.01) |
| B29C 49/04 | (2006.01) |
| B29C 49/00 | (2006.01) |
| B29C 43/18 | (2006.01) |
| B29C 45/14 | (2006.01) |
| B29K 701/12 | (2006.01) |
| B60K 15/03 | (2006.01) |

(52) U.S. Cl.
CPC .............. *B29C 65/70* (2013.01); *B29C 43/18* (2013.01); *B29C 45/14311* (2013.01); *B29C 49/04* (2013.01); *B29C 2049/0057* (2013.01); *B29C 2049/2008* (2013.01); *B29C 2049/2017* (2013.01); *B29C 2049/2047* (2013.01); *B29C 2791/006* (2013.01); *B29C 2791/007* (2013.01); *B29K 2701/12* (2013.01); *B29L 2031/7172* (2013.01); *B60K 15/03177* (2013.01); *B60K 2015/03032* (2013.01); *B60K 2015/03493* (2013.01)

(58) Field of Classification Search
USPC ......................................................... 220/562
See application file for complete search history.

(56) References Cited

U.S. PATENT DOCUMENTS

| | | | | |
|---|---|---|---|---|
| 8,220,768 | B1 | 7/2012 | Cantolino | |
| 8,684,443 | B2* | 4/2014 | Hara | ....................... B60R 19/48 |
| | | | | 296/97.22 |
| 10,023,322 | B2* | 7/2018 | Keefer | .................... B64D 37/02 |
| 10,112,753 | B2* | 10/2018 | Horikawa | ................ F16J 13/12 |
| 2002/0096526 | A1* | 7/2002 | Moser | .................... B60K 15/03 |
| | | | | 220/562 |
| 2002/0159825 | A1* | 10/2002 | Ito | .......................... B65D 90/08 |
| | | | | 403/270 |
| 2002/0167163 | A1* | 11/2002 | Ilo | ....................... B29C 45/0013 |
| | | | | 285/21.1 |
| 2003/0099795 | A1 | 5/2003 | Gombert et al. | |
| 2003/0173776 | A1* | 9/2003 | Morohoshi | ............. B29C 65/02 |
| | | | | 285/189 |
| 2007/0000928 | A1* | 1/2007 | Nishiyama | .............. B29C 65/02 |
| | | | | 220/562 |
| 2008/0135562 | A1* | 6/2008 | Miyajima | ........ B60K 15/03177 |
| | | | | 220/562 |
| 2008/0138554 | A1* | 6/2008 | Maeda | .................... B29C 66/71 |
| | | | | 428/36.9 |
| 2011/0174946 | A1 | 7/2011 | Araya et al. | |
| 2013/0206775 | A1* | 8/2013 | Heidemeyer | .......... B60K 13/04 |
| | | | | 220/562 |

FOREIGN PATENT DOCUMENTS

| | | |
|---|---|---|
| JP | H03-261533 A | 11/1991 |
| JP | H08-192457 A | 7/1996 |
| JP | 2007-090636 A | 4/2007 |
| JP | 2011-212995 A | 10/2011 |
| JP | 2014-043064 A | 3/2014 |
| JP | 2014-046676 A | 3/2014 |
| JP | 2014-231165 A | 12/2014 |
| JP | 2015-089771 A | 5/2015 |

OTHER PUBLICATIONS

Office Action from corresponding Chinese application dated Aug. 31, 2018, by Chinese Patent Office—Chinese Version (7 pages).
International Search Report from PCT/JP2016/080313 dated Jan. 10, 2017, by Japan Patent Office—English Version (2 pages).
International Search Report from PCT/JP2016/080313 dated Jan. 10, 2017, by Japan Patent Office—Japanese Version (2 pages).
Written Opinion of the International Searching Authority from PCT/JP2016/080313 dated Jan. 10, 2017, by International Searching Authority—English Version (3 pages).
Written Opinion of the International Searching Authority from PCT/JP2016/080313 dated Jan. 10, 2017, by International Searching Authority—Japanese Version (3 pages).
International Prel. Report on Patentability from from PCT/JP2016/080313 dated Sep. 5, 2017, by International Preliminary Examining Authority—English Version (9 pages).
International Prel. Report on Patentability from from PCT/JP2016/080313 dated Sep. 5, 2017, by International Preliminary Examining Authority—Japanese Version (9 pages).

* cited by examiner

WELDING METHOD AND WELDING STRUCTURE

CROSS-REFERENCE TO RELATED APPLICATION

This application is a U.S. National Stage Application under 35 U.S.C § 371 of International Patent Application No. PCT/JP2016/080313 filed Oct. 13, 2016, which claims the benefit of priority to Japanese Patent Application No. 2015-209092 filed Oct. 23, 2015, the disclosures of all of which are hereby incorporated by reference in their entities.

TECHNICAL FIELD

The present invention relates to a method and a structure for welding an accessory part to a fuel tank of a vehicle.

BACKGROUND ART

Patent literature 1 discloses a method and a structure for welding an accessory part to an outer wall surface of a fuel tank. The accessory part (a valve in patent literature 1) is made of a thermoplastic resin and includes: a housing having a hollow interior; and a flange extending from an end portion of the housing in a radially outward direction. The flange has a plurality of ribs formed thereon that project in a press direction.

The welding method carries out steps of: holding the accessory part on molds for molding a tank body; and molding the tank body by transferring a parison to the molds and, at the same time, pressing the flange and the plurality of ribs into the parison. When the flange and ribs are pressed into the parison, the flange and ribs melt due to the heat of the parison and whereby the accessory part is welded to an outer wall surface of the tank body. According to this conventional technique, due to the plurality of ribs, the accessory part can be welded even with heat of a relatively low-temperature (approximately 180° C.) parison.

PRIOR ART DOCUMENT

Patent Literature

Patent literature 1: U.S. Pat. No. 5,103,865

SUMMARY OF INVENTION

Problems to be Solved by the Invention

When heat of the parison is used for welding as in the conventional technique, in order to increase the weld strength, it is conceivable to increase the height of the ribs and/or to form a plurality of ribs. However, when the height of the ribs is increased, the parison is less likely to come in contact with the flange and thus a welding failure may occur. Meanwhile, when forming the plurality of ribs, distance intervals between the plurality of ribs need to be large enough so that the parison can enter between adjacent ribs. This means the projection length of the flange needs to be increased, which reduces flexibility of design.

In view of the foregoing, it is an object of the present invention to provide a welding method and welding structure that increase flexibility of design and increase the weld strength.

Solution to Problem

In order to achieve the above object, the present invention provides a method for welding an accessory part made of a thermoplastic resin to a molten resin which is being molded into a tank body. The welding method includes steps of: forming the accessory part to include (i) an annular portion having an annular shape and (II) a plurality of projections each projecting from the annual portion in a radial direction; and pressing the annular portion and the projections into the molten resin to be welded to the molten resin.

The present invention also provides a welding structure of a tank body made of a resin and an accessory part made of a thermoplastic resin and welded to a wall surface of the tank body. The accessory part includes: an annular portion having an annular shape; and a plurality of projections each projecting from the annular portion in a radial direction. The annular portion and the plurality of projections are welded to the wall surface.

With this structure, the plurality of projections each projecting in a radial direction provide a large area of weld to the molten resin, and thus may increase the weld strength. In addition, the area of weld may be increased without increasing the length (thickness) of the annular portion in a radial direction. This may contribute to increasing flexibility of design.

It is preferable that the welding method further includes a step of holding the accessory part on a mold for molding the tank body, wherein, in the step of pressing the annular portion and the projections, the accessory part is welded to an outer surface of the molten resin when molding the tank body. This facilitates welding the accessory parts to an outer wall of the tank body.

It is preferable that the plurality of projections each project in a radially inward direction. With this structure, an outer periphery surface of the annular portion is made smooth.

It is preferable that the plurality of projections are formed at equal intervals along a circumference. With this structure, the heat of the molten resin is transferred evenly to the projections, which allows well-balanced welding.

Advantageous Effects of the Invention

The welding method and welding structure of the present invention may increase flexibility of design and increase the weld strength.

EMBODIMENTS FOR CARRYING OUT THE INVENTION

Figure 1:
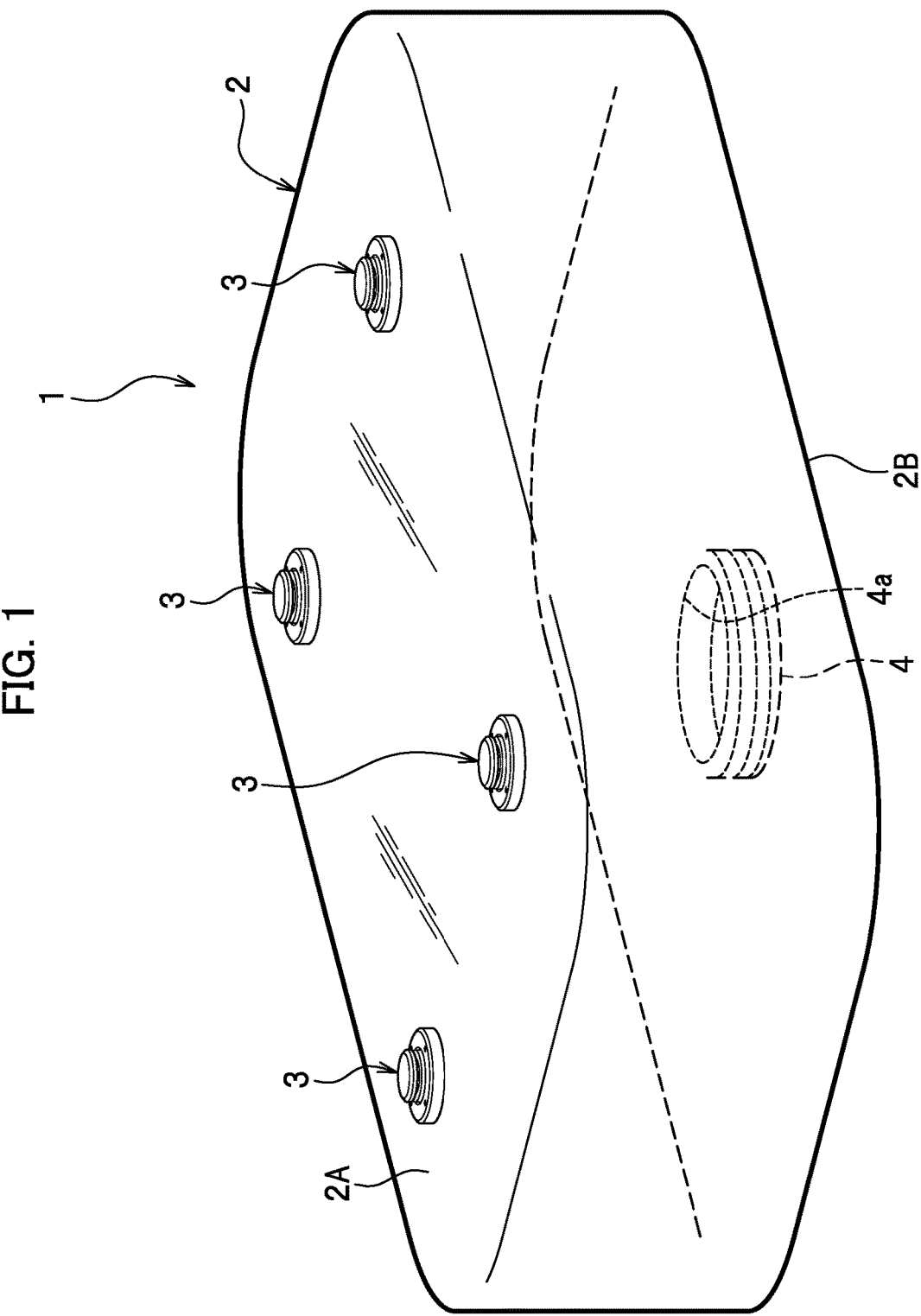
FIG. 1 is a perspective view showing a fuel tank according to an embodiment of the present invention.

A description is given of an embodiment of the present invention with reference to the drawings as appropriate. As shown in FIG. 1, a fuel tank 1 of the present embodiment is mainly composed of a tank body 2, four accessory parts 3, and a pomp attaching portion 4. The tank body 2 is a hollow container made of resin and adapted for storing fuel.

The accessory parts 3 are welded to a first surface 2A of the tank body 2. The first surface 2A is one that faces the ground when the fuel tank 1 is attached to a vehicle. The accessory parts 3 are clips for attaching a protection plate for protecting outer peripheries of the fuel tank 1 (illustration of the protection plate is omitted in FIG. 1). The number of the accessory parts 3 in the present embodiment is four, but not limited thereto. The pomp attaching portion 4 is formed on a second surface 2B opposite the first surface 2A of the tank body 2. The pomp attaching portion 4 has an opening 4a formed therein to attach pomp.

Figure 2:
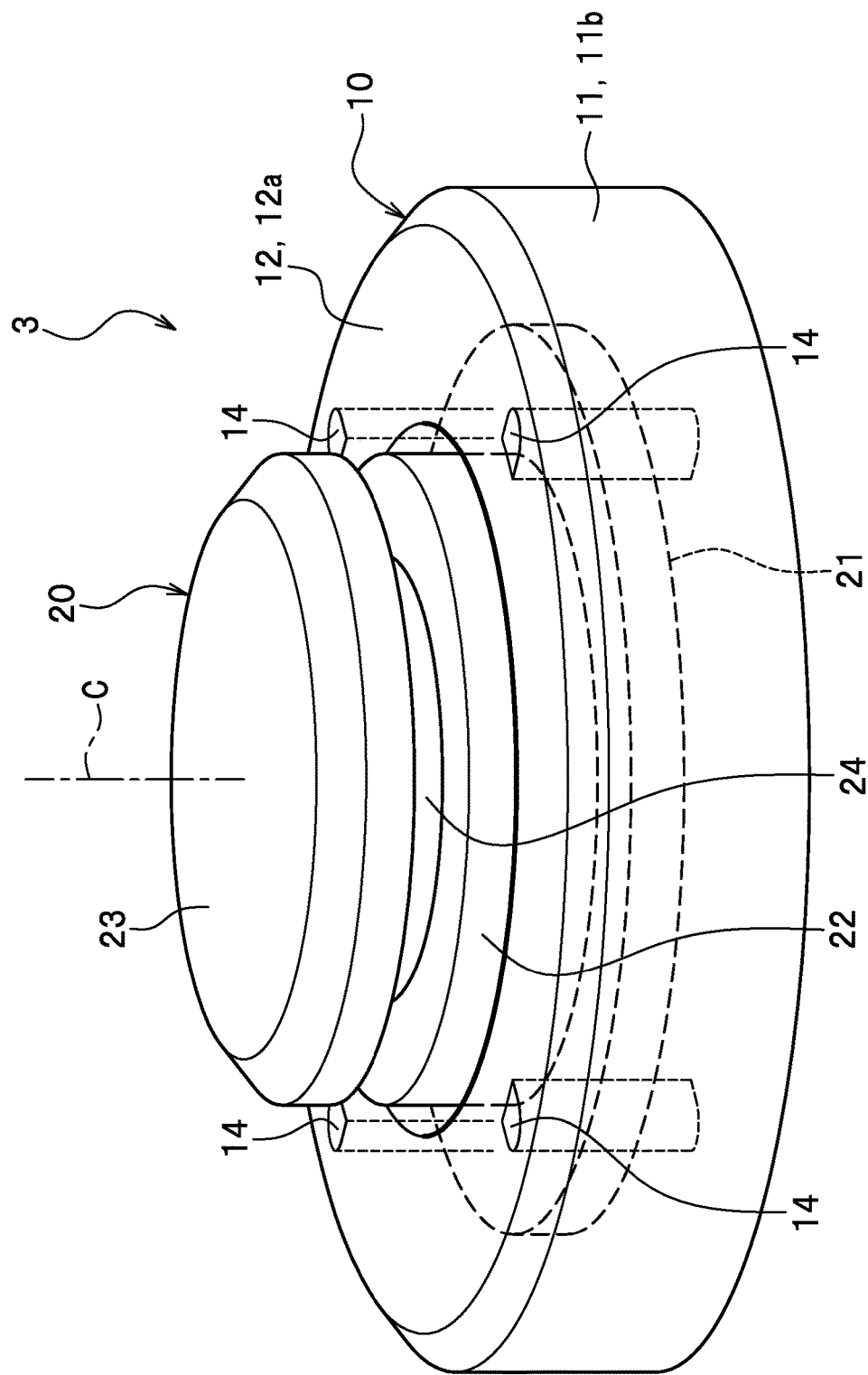
FIG. 2 is a perspective view of an accessory part according to the present embodiment, as seen from above obliquely.
Figure 3:
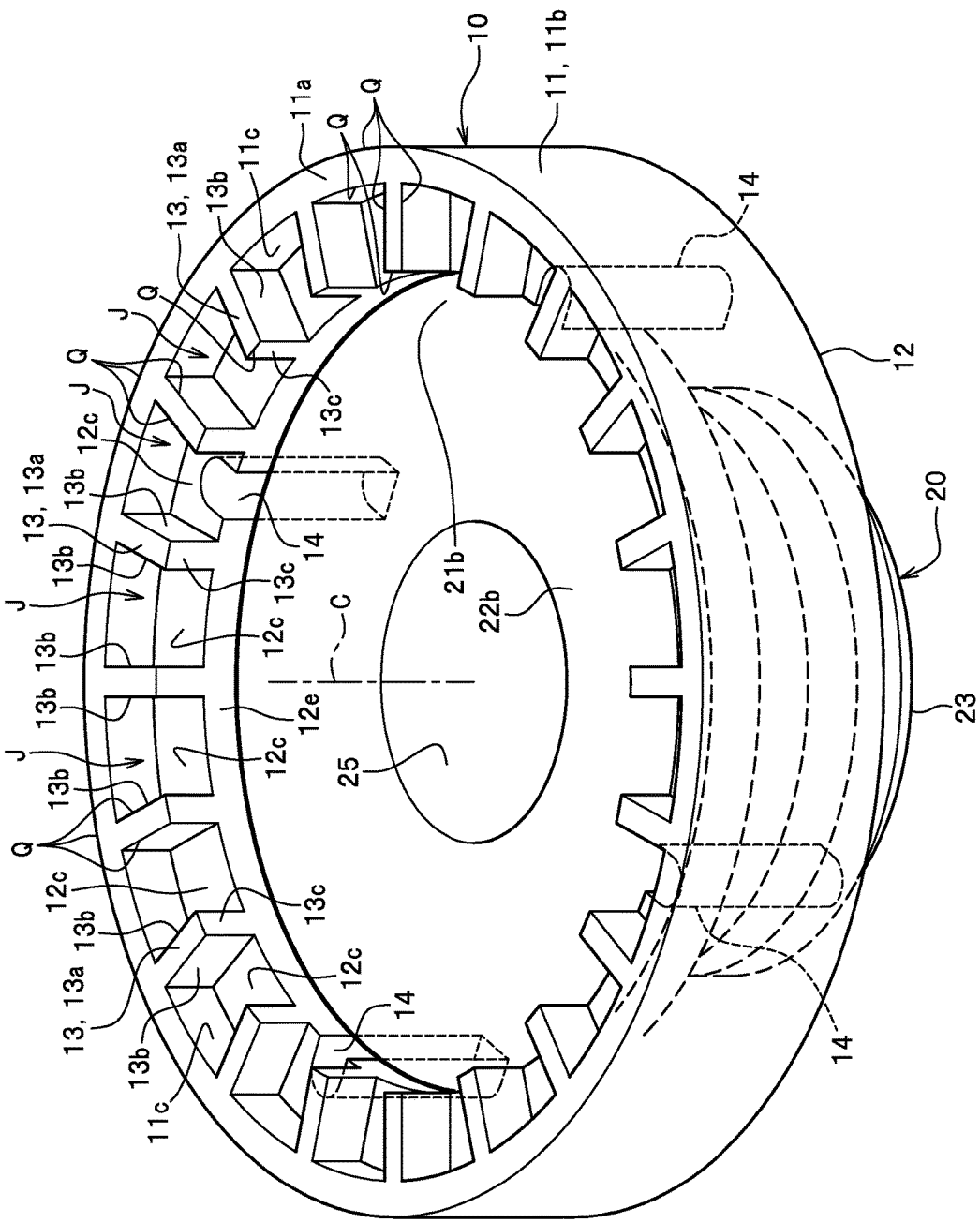
FIG. 3 is a perspective view of the accessory part according to the present embodiment, as seen from below obliquely.

As shown in FIG. 2, each of the accessory parts 3 in the present embodiment is composed of two members, a first member 10 and a second member 20. As shown in FIGS. 2 and 3, the first member 10 includes an annular portion 11, a body portion 12, and a plurality of projections 13. The first member 10 supports the second member 20 and is welded to the tank body 2. The first member 10 is integrally molded of a thermoplastic resin (e.g., polyethylene) having a lower melting point than the parison later described. The annular portion 11 has a hollow cylindrical shape. The annular portion 11 has a length (thickness) in a radial direction, which can be chosen as appropriate. An example of that length is about 1 mm. The body portion 12 extends from an end portion of the annular portion 11 in a direction toward an axis C.

Figure 4:
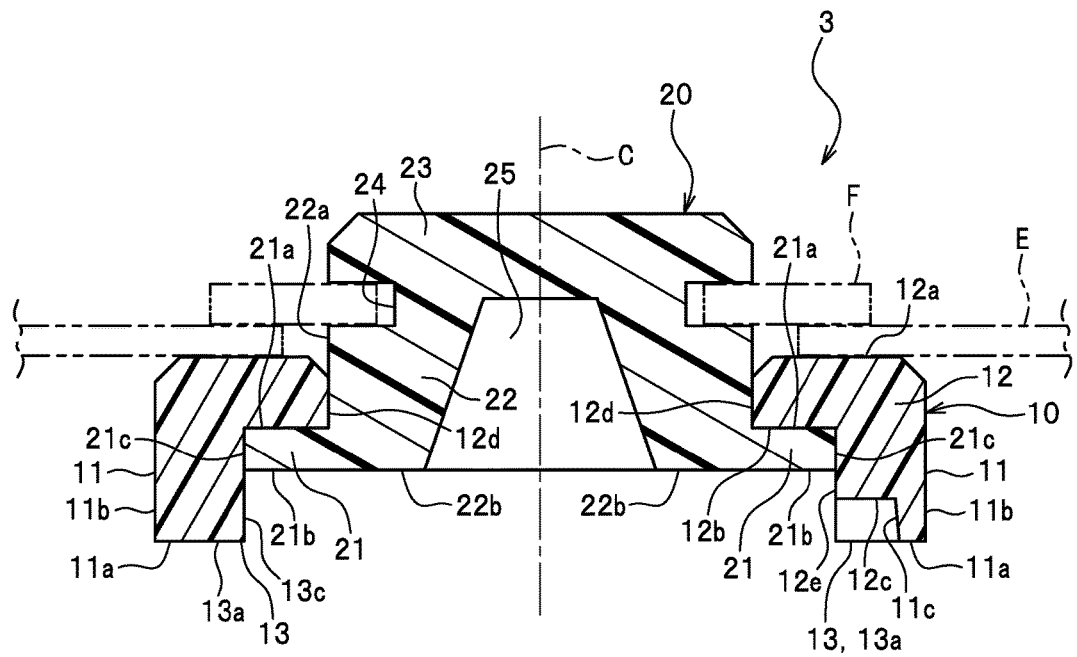
FIG. 4 is a cross-sectional view showing the accessory part according to the present embodiment, wherein the cross section to the left of axis C includes a projection of the accessory part, and the cross section to the right of axis C does not include any projection of the accessory part.

As shown in FIG. 4, the body portion 12 has a first inner periphery surface 12d centrally formed therein and having a circular shape in a plan view, along which a trunk portion 22 of the second member 20 is inserted into the body portion 12. The body portion 12 has a first bottom surface 12b that is perpendicular to the first inner periphery surface 12d and a second bottom surface 12c formed spaced apart from the first bottom surface 12b. The body portion 12 further has a second inner periphery surface 12e formed perpendicular to the first bottom surface 12b and the second bottom surface 12c.

As shown in FIG. 3, each of the projections 13 projects from the annular portion 11 in a radially inward direction and stands on the second bottom surface 12c. The projections 13 each have a plate shape in the present embodiment. The projections 13 are formed radially extending toward the axis C at equal intervals along a circumference of the annular portion 11. The dimensions of the projections 13 can be selected as appropriate. As an example, each of the projections 13 may have a thickness of about 1 mm, a height of about 3 mm, and a radial length of about 3 mm. The distance between adjacent projections 13 may be, for example, 3 mm to 4 mm. In the present embodiment, the thickness of the projections 13 is slightly thinner than the radial length (thickness) of the annular portion 11.

An end surface 11a of the annular portion 11 is flush with end surfaces 13a of the projections 13. Side end surfaces 13c of the projections 13 are flush with the second inner periphery surface 12e of the body portion 12. An inner periphery surface 11c of the annular portion 11, the second bottom surface 12c of the body portion 12, and side surfaces 13b of adjacent ones of the projections 13 define recessed portions J. The recessed portions J are where parison enters in the molding step described later.

Figure 5:
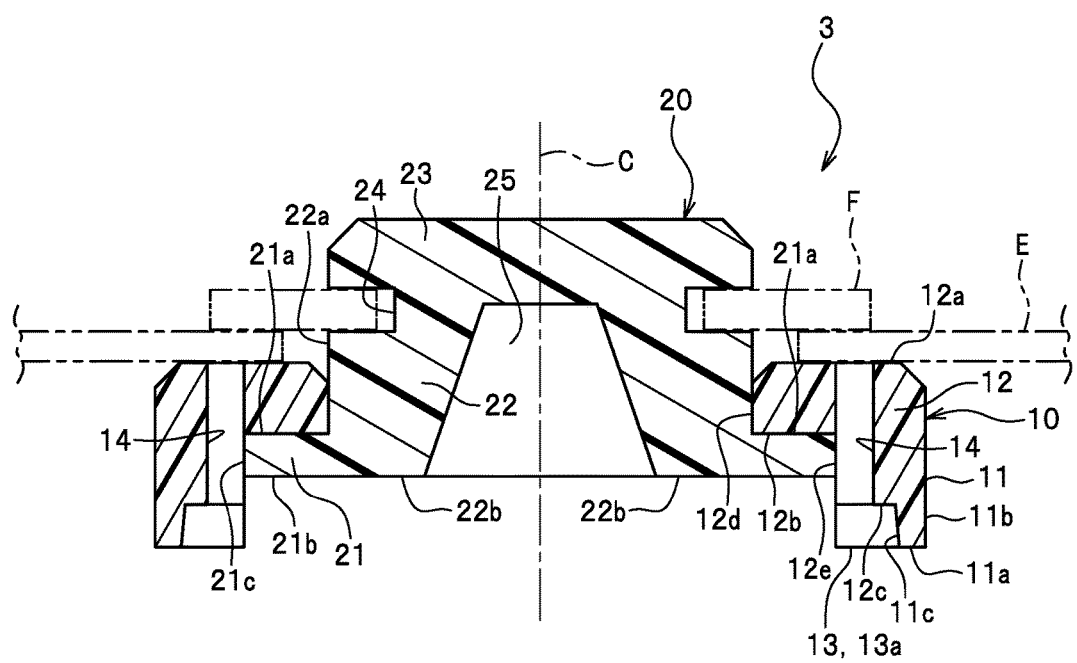
FIG. 5 is a cross-sectional view showing the accessory part according to the present embodiment, wherein the cross section includes communication holes of the accessory part.

As shown in FIG. 5, the body portion 12 has communication holes 14 formed therein that penetrate the body portion 12 in a height direction. The communication holes 14 each have one end opened at an upper surface 12a of the body portion 12 and have the other end opened at the second bottom surface 12c of the body portion 12. The communication holes 14 each function as an air vent hole in the molding step described later. The number of the communication holes 14 are not specifically limited. In the present embodiment, the four communication holes 14 are provided.

As shown in FIGS. 2 and 3, the second member 20 includes a flange portion 21, the trunk portion 22, a head portion 23, and a neck portion 24. The second member 20 is for attaching a protection plate E (see FIG. 4) thereto. The second member 20 is integrally formed of a thermoplastic resin having a melting point lower than that of the parison. Preferably, in the present embodiment, the second member 20 is made of a material having a higher melting point than the first member 10 and having a higher rigidity than the first member 10 (e.g., Nylon PA66-GF), to provide the function of attaching the protection plate E thereto.

The flange portion 21 has a ring shape and extends laterally from an outer periphery surface of the trunk portion 22. A lower surface 21b of the flange portion 21 is flush with a lower surface 22b of the trunk portion 22. The trunk portion 22 has a substantially hollow cylindrical shape. The trunk portion 22 has a recessed portion 25 formed therein having a frustum shape. The head portion 23 is formed apart from the trunk portion 22. The head portion 23 has a substantially cylindrical shape. The trunk portion 22 and the head portion 23 have the same outer diameter. The neck portion 24 is formed between the trunk portion 22 and the head portion 23. The neck portion 24 has an outer diameter smaller than the outer diameter of the trunk portion 22 and the head portion 23. A ring-shaped holding clip F is attached to the neck portion 24 to firmly hold the protection plate E between the holding clip F and the first member 10. Alternatively, the holding clip F may be omitted and the protection plate E may be directly fixed to the neck portion 24.

The second member 20 is pressed into the first member 10 to integrate the second member 20 with the first member 10. Specifically, an outer periphery surface 22a of the trunk portion 22, an upper surface 21a of the flange portion 21, and an end surface 21c of the flange portion 21 respectively abut against the first inner periphery surface 12d, the first bottom surface 12b, and the second inner periphery surface 12e of the first member 10, and thereby the second member 20 is integrated with the first member 10.

In the present embodiment, the accessory parts 3 each are composed of two members, but are not limited thereto. The accessory parts 3 each may be composed of a single member or three or more members. Also in those cases, a portion having an annular portion and projections may be formed to have a lower melting point than other portions to facilitate the melting of the annular portion and the projections.

Figure 6:
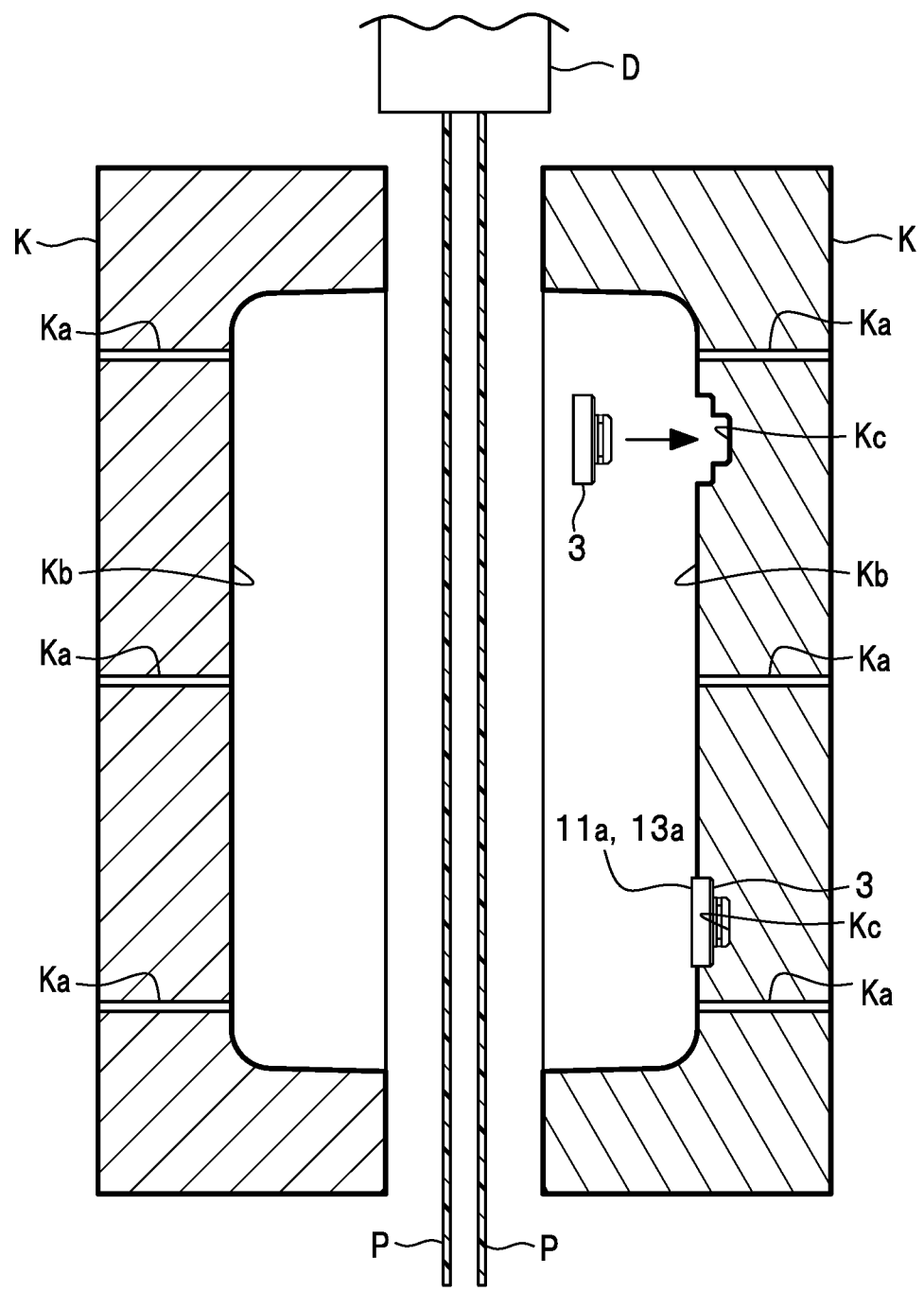
FIG. 6 is a cross-sectional view illustrating a holding step of a welding method according to the present embodiment.

Next, a description is given of a welding method (welding structure) according to the present embodiment. In the welding method according to the present embodiment, a holding step, a parison placing step, a press-in step, and a molding step are carried out. As shown in FIG. 6, the holding step makes molds K, K hold accessory parts 3. The molds K are used to mold the tank body 2. The molds K have a plurality of through-holes Ka formed therein that connect molding surfaces Kg with the outside. The through-holes Ka are flow channels for performing vacuum suction to draw parisons P. The molding surface Kg of one of the molds K has grooves Kc formed thereon to hold the accessory parts 3. When the accessory parts 3 are placed in the grooves Kc, the end surfaces 11a and 13a of each of the accessory parts 3 slightly project from the molding surface Kb of the mold K.

The parison placing step places parisons P, P (molten resin) between the molds K using a transporter D. The parison P is formed using a thermoplastic resin as a base material, and have a multi-layer structure including a barrier layer. The parisons P are provided in sheets in the present embodiment, but may be provided in a hollow cylindrical shape.

Figure 7:
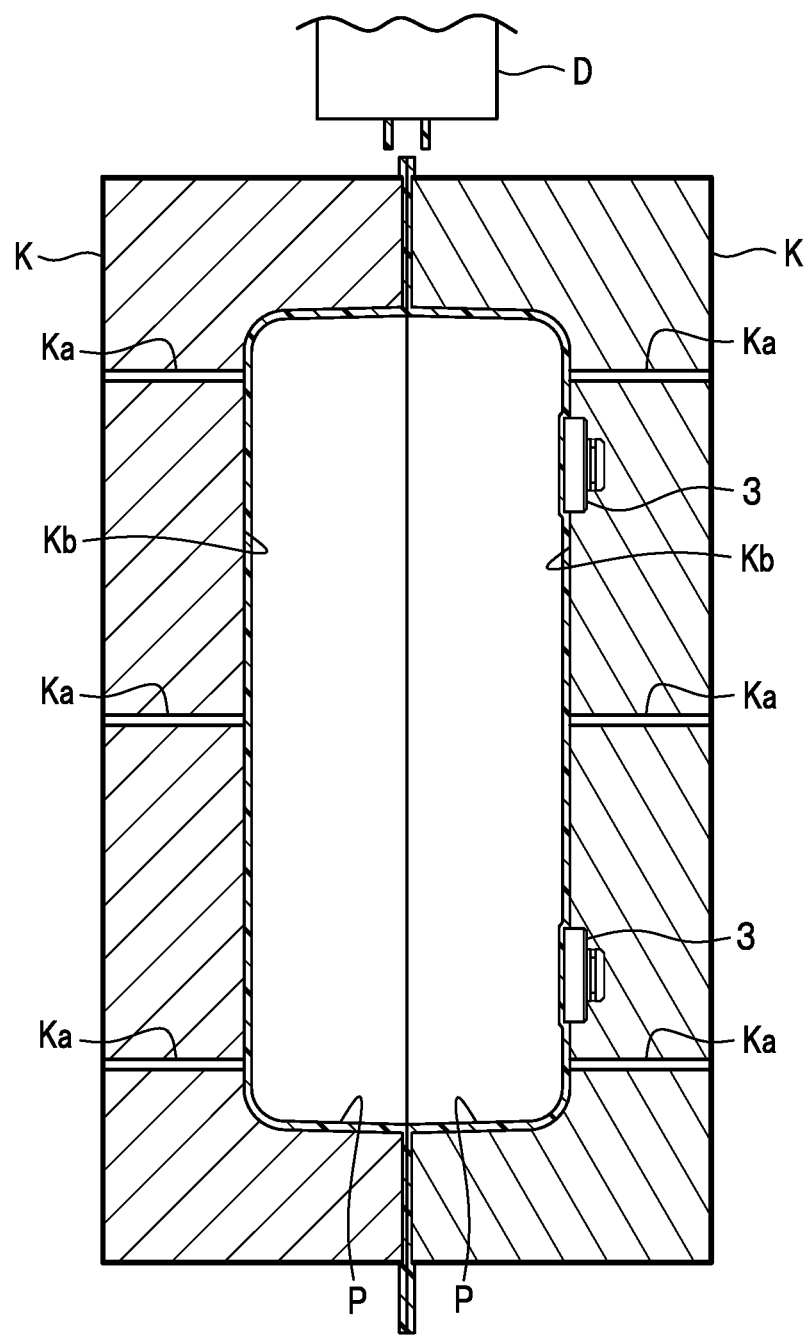
FIG. 7 is a cross-sectional view illustrating a press-in step and a molding step of the welding method according to the present embodiment.

The press-in step and the molding step are carried out at substantially the same time in the present embodiment. As shown in FIG. 7, in the press-in step and the molding step, the accessory parts 3 are pressed into an outer surface of the parison P, and at the same time the tank body 2 is molded. In the press-in step and the molding step, the molds K are clamped, and then vacuum suction is applied to the molds K via the through-holes Ka, to transfer the parisons P to the molding surfaces Kb. After that, the tank body 2 is demoted from the molds K to be extracted.

Figure 8:
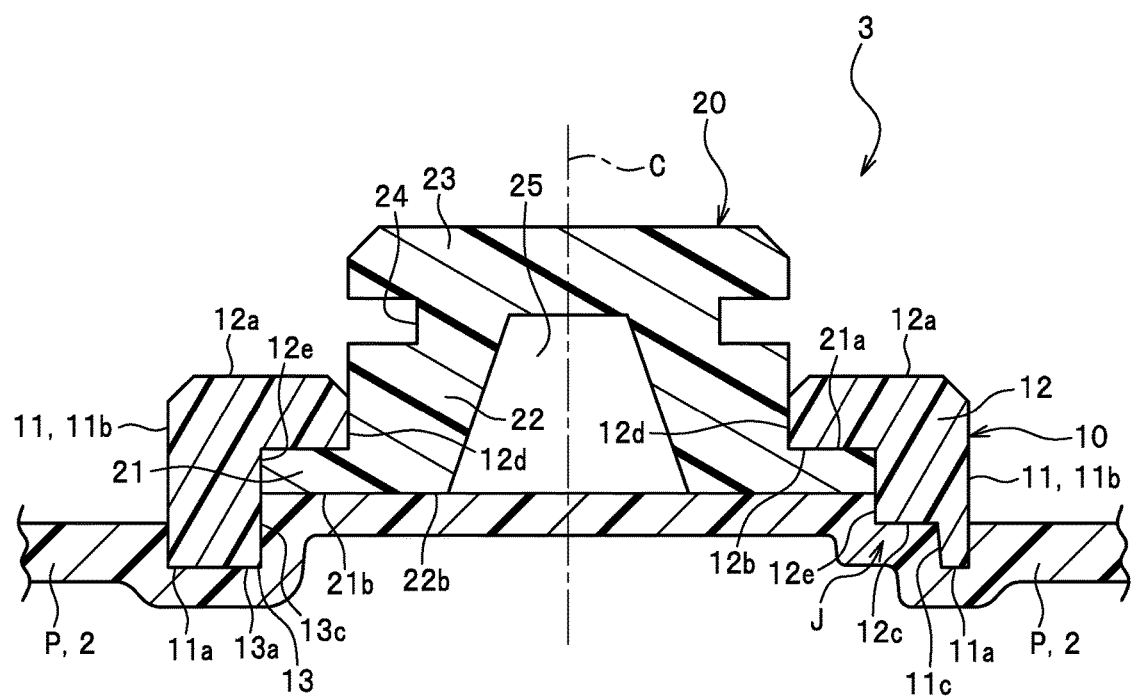
FIG. 8 is a diagram illustrating a welding structure according to the present embodiment, wherein the cross section to the left of axis C includes a projection of the welding structure, and the cross section to the right of axis C does not include any projection of the welding structure.

In the press-in step, as shown in FIGS. 3 and 8, the vacuum suction causes the parison P to enter each of the recessed portions J of the accessory parts 3, and the first member 10 and the second member 20 partially melt and weld to the parison P by the heat (approximately 180° C.) Of the parison P. When the parison P enters the recessed portions J, air is discharged via the communication holes 14 to the outside. When the vacuum suction causes the parison P to enter the first member 10, the end surface 11a, an outer periphery surface 11b, and the inner periphery surface 11c of the annular portion 11 come in contact with and weld to the parison P. Further, the end surface 13a, the side surfaces 13b, and the side end surface 13c of each of the projections 13 and the second bottom surface 12c come in contact with and weld to the parison P. Furthermore, the lower surface 21b of the flange portion 21 and the lower surface 22b of the trunk portion 22 of the second member 20 come in contact with and weld to the parison P.

According to the above-described welding method and welding structure, the plurality of projections 13 each projecting from the annular portion 11 in a radial direction provide a large area of weld to the parison P, and thus increase the weld strength. In addition, the area of weld can be increased without increasing the length (thickness) of the annular portion 11 in a radial direction. This contributes to increasing flexibility of design.

When welding the accessory parts 3 to the tank body 2, the portion of each accessory part 3 that most contributes to the weld strength (i.e., the most melted portion) is a portion that first comes in contact with the parison P. The heat in the parisons P tends to concentrate in an edge portion defined by planes rather than in a flat surface. Accordingly, the shape of the portion of the accessory part 3 that first comes in contact with the parison P is a major consideration. In addition, when the accessory parts 3 are to be welded to the parison P only by the heat of the parison P as in the present embodiment, the welding needs to be completed with a limited amount of heat in the parison P. Therefore the portion of the accessory part 3 that first comes in contact with the parison P is particularly important.

If the portion of the accessory part 3 that first comes in contact with the parison P is simply a surface having a large area, the heat transferred is dissipated over the surface, in which case the surface may not be sufficiently melted due to the limited amount of heat in the parison P. As a result, the desired weld strength may not be obtained. In view of this, in the present embodiment, the annular portion 11 is structured such that the plurality of projections 13 are radially provided (the recessed portions J are each formed between corresponding adjacent ones of projections 13). With this structure, the end surfaces 11a and 13a, which first come in contact with the parison P, are provided with many edges (corners) Q (see FIG. 3) defined by surfaces including the end surfaces 11a and 13a.

Accordingly, as the heat of the parison P is concentrated to the end surfaces 11a and 13b as well as the edges Q defined by surfaces including the surfaces 11a and 13a, these end surfaces 11a and 13b as well as edges Q largely melt to contribute to the weld strength. Further, the parison P comes in contact with and welds to: the outer periphery surface 11b and the inner periphery surface 11c of the annular portion 11; the side surfaces 13b and the side end surfaces 13c of the projections 13; the second bottom surface 12c; and the lower surfaces 21b and 22b of the second member 20. That means the area of weld is increased in a height direction of the annular portion 11 and the projections 13. As understood from the above, according to the present embodiment, even only the heat in the parison P can provide increased weld strength.

According to the present embodiment, the accessory parts 3 are held on the molds K, and are welded to an outer surface of the parison P when molding the tank body 2, which facilitates welding of the accessory parts 3 to an outer wall surface of the tank body 2. In addition, the outer periphery surface 11b of the annular portion 11 is made smooth by configuring the plurality of projections 13 to project in radially inward directions as in the present embodiment. In addition, as the plurality of projections 13 are formed at equal intervals along a circumference, the heat of the parison P is transferred evenly to the projections 13, which allows well-balanced welding.

According to the present embodiment, as the communication holes 14 allow air in the accessory parts 3 to be discharged to the outside of the accessory parts 3, which prevents air pockets from developing between the parison P and the accessory parts 3 and thus increases the moldability.

While a description has been given of an embodiment of the present invention, design modifications can be made appropriately to the embodiment without departing from the spirit of the present invention. In the present embodiment, the projections 13 each have a plate shape. Instead, projections may each be formed to have a column shape, for example. Alternatively, the projections may each be formed to have a pyramid shape or a conical shape. When the projections each have a pyramid shape or a conical shape, the sharpened portions of them is likely to melt. In the present embodiment, the projections 13 project from the annular portion 11 in radially inward directions. However, the projections 13 may be formed to project from the annular portion 11 in radially outward directions. In this case, an inner periphery surface of the first member 10 may be made smooth.

In the present embodiment, vacuum-molding is used in the molding step. However, blow molding or injection molding may be used instead. In the present embodiment, the accessory parts 3 are welded to the outer wall surface of the tank body 2 (i.e., outer surface of the parison P). However, the accessory parts 3 may be welded to an inner wall surface of the tank body 2 (i.e., inner surface of the parison P). In the present embodiment, clips for attaching the protection plate E are exemplified as the accessory parts 3, but the accessory parts 3 are not limited thereto. The accessory parts 3 may be various parts welded to the tank body 2, examples of which include valves and fuel wave-eliminating members. The dimensions presented in the embodiment are merely examples and are not intended to limit the scope of the present invention.

REFERENCE SIGNS LIST

1 fuel tank
2 tank body
3 accessory part
4 pomp attaching portion
10 first member
11 annular portion
11*a* end surface
12 body portion
13 projection
13*a* end surface
20 second member
K mold

The invention claimed is:
1. A welding structure of a tank body made of a resin and an accessory part made of a thermoplastic resin and welded to a wall surface of the tank body,
   wherein the accessory part comprises:
      an annular portion having an annular shape;
      a plurality of projections each projecting from the annular portion in a radially inward direction and having at least two surfaces defining a corner therebetween, the at least two surfaces including an end surface; and
      a plurality of recessed portions each of which is formed between adjacent ones of the plurality of projections and has an inner surface defined by one of the at least two surfaces other than the end surface of each of the adjacent ones of the plurality of projections, and
      the annular portion and the plurality of projections are welded to the wall surface so that the wall surface of the tank body has portions that have respectively entered the plurality of recessed portions and have been respectively welded to the inner surfaces thereof and so that the corner and the end surface of each of the plurality of projections are welded to the wall surface.
2. The welding structure of claim 1, wherein the plurality of projections are provided at equal intervals along a circumference.
3. The welding structure of claim 1, wherein the annular portion and the plurality of projections of the accessory part are integrally molded.

* * * * *